(12) United States Patent
Li

(10) Patent No.: US 9,542,271 B2
(45) Date of Patent: Jan. 10, 2017

(54) METHOD AND APPARATUS FOR REDUCING READ LATENCY

(71) Applicant: Huawei Technologies Co., Ltd., Shenzhen (CN)

(72) Inventor: Yansong Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 156 days.

(21) Appl. No.: 14/474,502

(22) Filed: Sep. 2, 2014

(65) Prior Publication Data

US 2015/0019918 A1    Jan. 15, 2015

Related U.S. Application Data

(63) Continuation of application No. PCT/CN2012/082964, filed on Oct. 15, 2012.

(30) Foreign Application Priority Data

Mar. 30, 2012  (CN) .......................... 2012 1 0095907

(51) Int. Cl.
*G06F 11/00* (2006.01)
*G06F 11/10* (2006.01)
(Continued)

(52) U.S. Cl.
CPC ....... *G06F 11/1088* (2013.01); *G06F 11/0766* (2013.01); *G06F 11/108* (2013.01);
(Continued)

(58) Field of Classification Search
CPC .............. G06F 11/1088; G06F 11/0766; G06F 11/1092; G06F 11/167; G06F 11/108; G06F 11/0727; G06F 2201/845; G06F 2212/262; G06F 2212/7208
(Continued)

(56) References Cited

U.S. PATENT DOCUMENTS 5,555,390 A    9/1996   Judd et al.
5,867,732 A    2/1999   Young
(Continued)

FOREIGN PATENT DOCUMENTS

CN    1287361 A       3/2001
CN    101071362 A    11/2007
(Continued)

OTHER PUBLICATIONS

Foreign Communication From a Counterpart Application, European Application No. 12872554.6, Extended European Search Report dated Apr. 2, 2015, 6 pages.
(Continued)

*Primary Examiner* — Joseph D Manoskey
(74) *Attorney, Agent, or Firm* — Conley Rose, P.C.

(57) ABSTRACT

A method and an apparatus for reducing a read latency are provided. The method includes: when one or more flash chips corresponding to a read command are in a busy state, setting data read from the one or more flash chips in a busy state to wrong data; obtaining, according to the wrong data and data read from other flash chips, reconstructed correct data, and reporting the correct data. By using the present invention, data read from a flash chip is set to wrong data, and reconstructed correct data is obtained according to the wrong data and data read from other flash chips. In this way, when the flash chip is in a busy state, it can be avoided that a read operation is blocked by an erase operation or a write operation, thereby effectively reducing latency and improving a performance of a storage system.

10 Claims, 7 Drawing Sheets

(51) Int. Cl.
　　*G06F 11/07*　　　　(2006.01)
　　*G06F 11/16*　　　　(2006.01)
(52) U.S. Cl.
　　CPC ........ *G06F 11/1092* (2013.01); *G06F 11/167* (2013.01); *G06F 2201/845* (2013.01); *G06F 2212/262* (2013.01); *G06F 2212/7208* (2013.01)
(58) Field of Classification Search
　　USPC .................................. 714/6.2, 6.1, 6.22, 42
　　See application file for complete search history.

(56) References Cited

U.S. PATENT DOCUMENTS

| | | | |
|---|---|---|---|
| 6,304,941 | B1 | 10/2001 | Lyons et al. |
| 6,412,041 | B1 | 6/2002 | Lee |
| 7,945,752 | B1 | 5/2011 | Miller et al. |
| 8,074,021 | B1 | 12/2011 | Miller et al. |
| 8,301,832 | B1 * | 10/2012 | Moore .................... G06F 3/061 711/103 |
| 9,158,546 | B1 * | 10/2015 | Smith .................... G06F 9/3814 |
| 9,298,376 | B2 * | 3/2016 | Colgrove ............. G06F 3/0611 |
| 2007/0174670 | A1 | 7/2007 | Terry et al. |

FOREIGN PATENT DOCUMENTS

| | | |
|---|---|---|
| CN | 102662608 A | 9/2012 |
| KR | 20090071337 A | 7/2009 |
| WO | 2008121306 A2 | 10/2008 |
| WO | 2011044515 A2 | 4/2011 |

OTHER PUBLICATIONS

Foreign Communication From a Counterpart Application, Chinese Application No. 201210095907.1 Chinese Office Action dated Dec. 5, 2014, 5 pages.
Partial English Translation and Abstract of Chinese Patent Application No. CN102662608A, Sep. 11, 2014, 2 pages.
Foreign Communication From a Counterpart Application, PCT Application No. PCT/CN2012/082964, English Translation of International Search Report dated Jan. 17, 2013, 2 pages.
Foreign Communication From a Counterpart Application, PCT Application No. PCT/CN2012/082964, English Translation of Written Opinion dated Jan. 17, 2013, 5 pages.
Foreign Communication From a Counterpart Application, Chinese Application No. 201210095907.1, Chinese Office Action dated Jun. 5, 2014, 8 pages.

* cited by examiner

METHOD AND APPARATUS FOR REDUCING READ LATENCY

CROSS-REFERENCE TO RELATED APPLICATIONS

This application is a continuation of International Application No. PCT/CN2012/082964, filed on Oct. 15, 2012, which claims priority to Chinese Patent Application No. 201210095907.1, filed on Mar. 30, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of data storage technologies, and in particular, to a method and an apparatus for reducing a read latency.

BACKGROUND

Common data carriers in a storage field are a mechanical hard disk and a solid-state drive (SSD). Because the SSD has such advantages as high performance, a low delay, low power consumption, and powerful environmental adaptability and also costs of the SSD are on the decrease, the SSD is applied more widely at present.

The SSD is generally formed by an NAND flash chip. It has inherent problems such as bit transition and read interference, which causes errors of read data, and also has a limitation of erase and write times. Therefore, measures are taken to ensure reliability of the structure of the NAND flash chip and the SSD design. For example, the NAND flash chip includes one or more wafers inside, where each wafer includes multiple planes; each plane includes multiple blocks, and each block includes multiple pages.

A page is a basic unit of reading and writing data, and includes multiple bytes (for example, 2048+64 bytes), where every 512 bytes+16 bytes represent one error detection/error correction unit, where 512 bytes are used to store data and 16 bytes are used to store error detection/error correction codes. When data is read, each unit of 512+16 bytes performs check; if only few bits have errors, the errors may be corrected; if too many bits have errors and the errors cannot be corrected, an upper layer error correction mechanism, for example, a redundant array of independent disks (RAID) algorithm needs to be used to solve the errors.

A block of the NAND flash chip is a basic erasing unit, and each block includes multiple pages (for example, 64 pages). To modify data that has already been written to the flash chip, a block where the data is located must be first erased before new data is written to the flash chip. This is a basic feature of the flash chip.

During the working process, the SSD needs to execute an erase or write operation constantly, while the flash chip is in a busy state (which is represented by using a hardware pin R/B# of the chip; a high level represents a ready state, and a low level represents a busy state) when these two operations are executed, and therefore cannot further respond to the read operation. The read operation can be continued only after the erase or write operation is completed. Erasing a block of the NAND flash chip generally requires 3 milliseconds (ms), a write operation generally requires 900 microseconds (us), while a read operation generally requires only 50 us. In this way, the erase and write operations block the read operation, which causes a large read latency and affects performance of the storage system. This phenomenon is more obvious in a scenario where there are extremely frequent erase or write operations.

SUMMARY

To solve a problem that when a current storage device based on flash chips performs read, write, and erase operations concurrently, the read operation is blocked by the erase and write operations, and therefore a large read latency is caused, the present invention provides a method and an apparatus for reducing a read latency.

An embodiment of the present invention provides a method for reducing a read latency, including when one or more flash chips corresponding to a read command are in a busy state, setting data read from the one or more flash chips in a busy state to wrong data; and obtaining, according to the wrong data and data read from other flash chips, reconstructed correct data, and reporting the correct data.

An embodiment of the present invention provides an apparatus for reducing a read latency, including an error setting unit configured to when one or more flash chips corresponding to a read command are in a busy state, set data read from the one or more flash chips in a busy state to wrong data; and a reconstructing and reporting unit configured to obtain, according to the wrong data and data read from other flash chips, reconstructed correct data, and report the correct data.

It can be seen from the foregoing technical solutions provided by the embodiments of the present invention, data read from a flash chip is set to wrong data, and reconstructed correct data is obtained according to the wrong data and data read from other flash chips. In this way, when the flash chip is in a busy state, it can be avoided that a read operation is blocked by an erase operation or a write operation, thereby effectively reducing latency and improving a performance of a storage system.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

An embodiment of the present invention provides a method for reducing a read latency, including, when one or more flash chips corresponding to a read command are in a busy state, setting data read from the one or more flash chips in a busy state to wrong data; obtaining, according to the wrong data and data read from other flash chips, reconstructed correct data, and reporting the correct data. The technical solution provided by this embodiment is mainly applied in an SSD device which is formed by a host, an SSD controller, and flash chips of multiple channels, where the host reads and writes data in the flash chips by using the SSD controller. The hardware structure of the SSD device includes a server subrack in which a motherboard is set; the motherboard is installed with such chips as central processing unit (CPU), memory, and south bridge, and is configured to control other expansion cards and implement functions of the host; the SSD controller (controls flash chips in the SSD) may also use a chip such as field-programmable gate array (FPGA) and application-specific integrated circuit (ASIC), and receives a read and write request from the host by programming this chip, and accesses and controls the flash chips in the SSD device in various manners. The chip corresponding to the SSD controller may be set together with each flash chip on one printed circuit board (PCB), where the chip and each flash chip are connected by using wires of the PCB, and are finally presented as a hard disk box, which is connected to the motherboard through a Serial Advanced Technology Attachment (SATA) interface or a Serial Attached Small Computer System Interface (SAS) interface, or the flash chips and the SSD controller may be made into an expansion card, which is connected to the motherboard through a Peripheral Component Interconnect Express (PCIe) interface.

Figure 1:
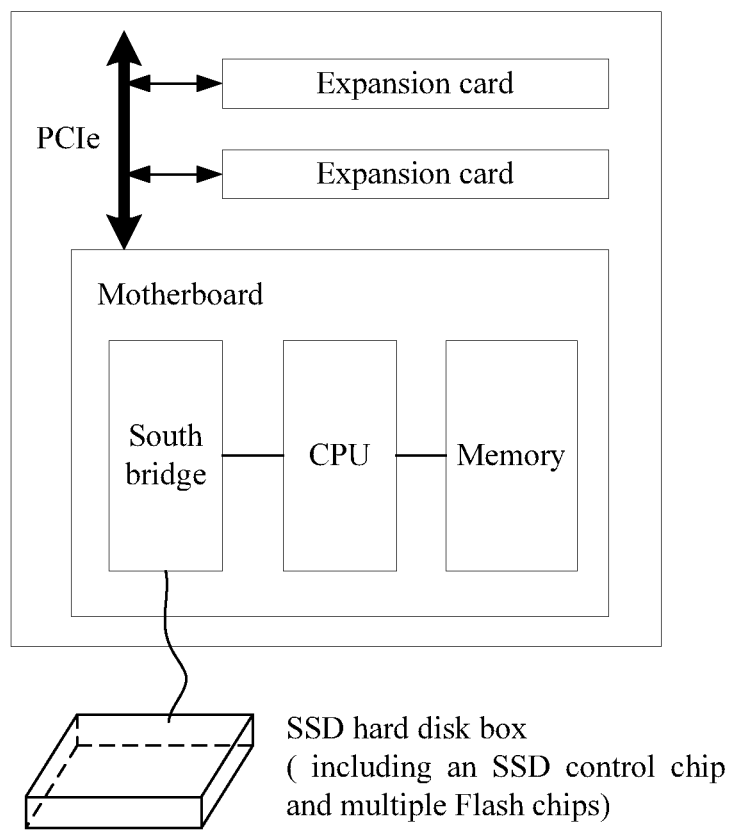
FIG. 1 is a schematic structural diagram of an SSD device in combination with specific hardware according to an embodiment of the present invention.
Figure 2:
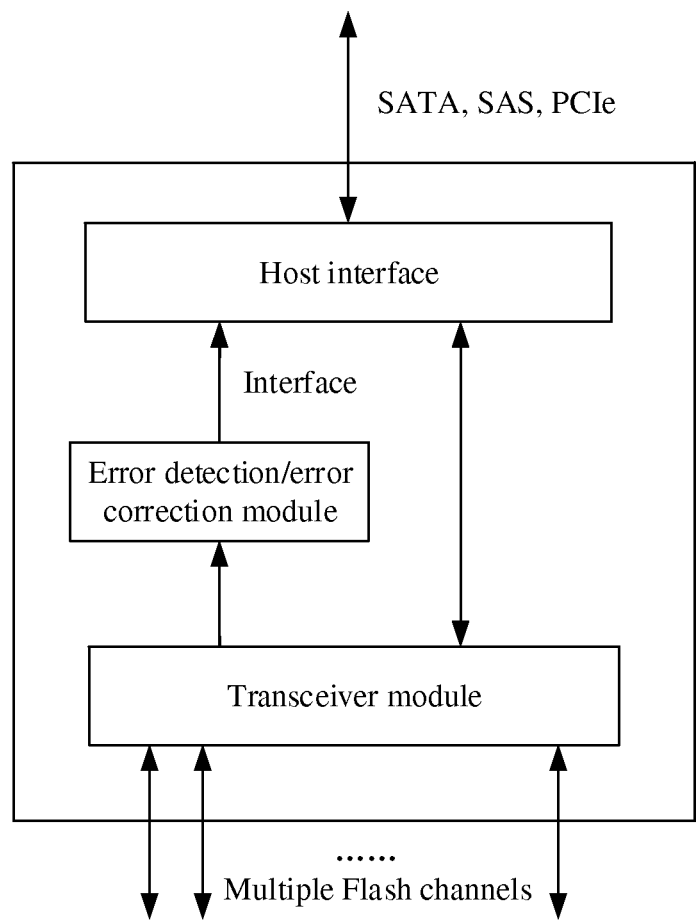
FIG. 2 is a schematic structural diagram of an SSD controller according to an embodiment of the present invention.

FIG. 1 shows a structure of an SSD device in combination with specific hardware. As shown in FIG. 2, the structure of the SSD controller includes a host interface, an error detection/error correction module, and a transceiver module. The corresponding host interface is configured to receive various commands and corresponding addresses and data, for example, read data at an address or write data to an address. Currently, common interfaces include SATA, SAS, and PCIe; the transceiver module is configured to implement transceiving of data or commands; the error detection/error correction module is configured to ensure correctness of data taken from flash chips, and then report the data to the host; the error detection/error correction module mainly implements the following two functions: 1. Performing error detection and error correction on data of each flash channel and on check codes of the data, and invoking a RAID algorithm to restore the data if the data and check codes exceed a correction ability; 2. Executing the RAID algorithm, and if data of a channel has errors and the errors cannot be corrected, restoring the data of the channel by using correct data of other channels. The transceiver module is configured to receive data or state from flash chips on multiple channels where the data is further forwarded to the error detection/error correction module but the state is generally not returned to the host (but may also be returned to the host if the host needs the state; for example, the SATA interface may also query for a busy state of the SSD) and is used by the transceiver module, or convert a command from the host into a command that can be identified by the flash chips, or write data from the host to the flash chips of multiple channels, and also meet a requirement of the RAID algorithm for a data arrangement manner (that is, a strip manner).

Figure 3:
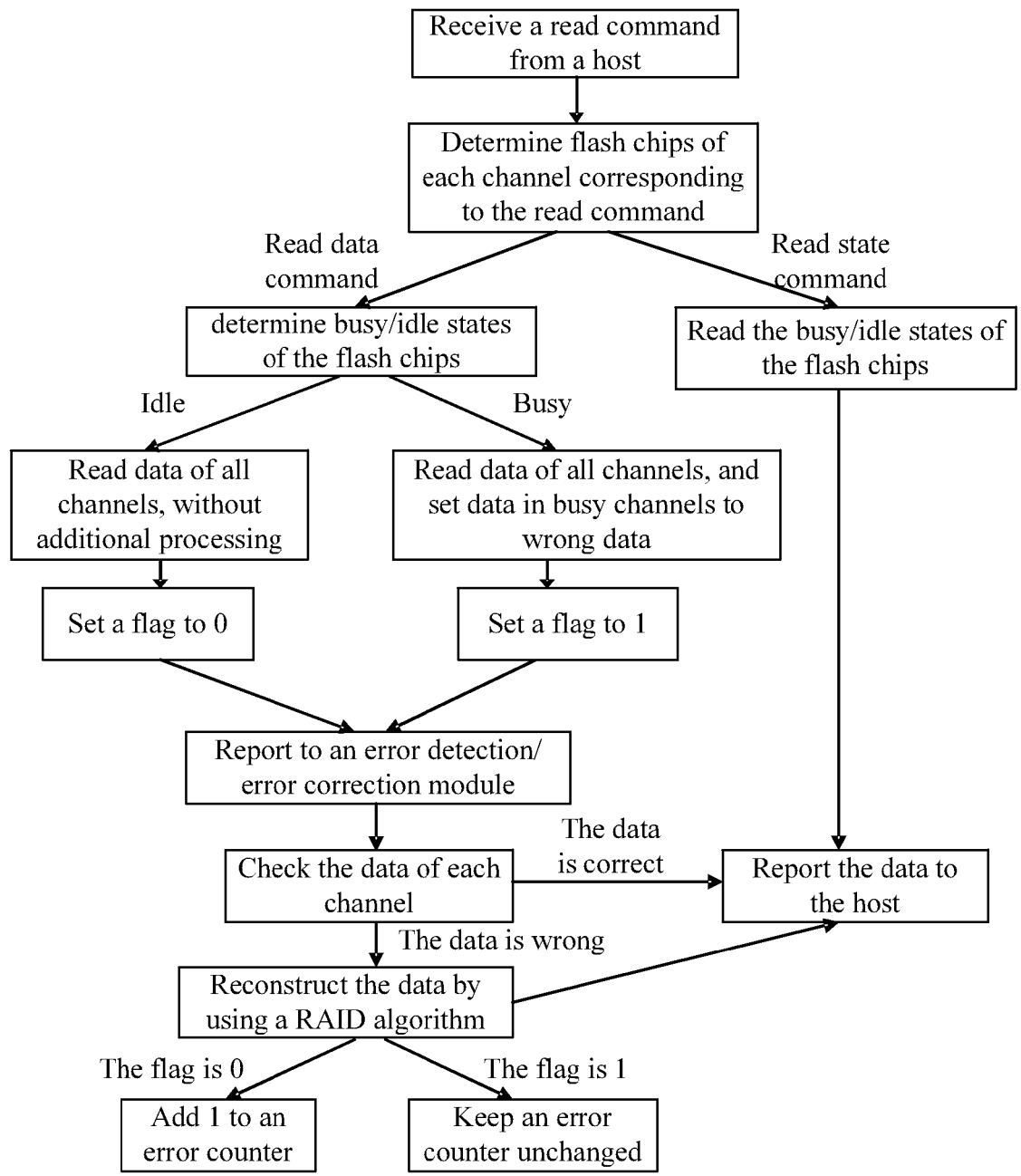
FIG. 3 is an overall block flowchart of a method for reducing a read latency according to an embodiment of the present invention.
Figure 4:
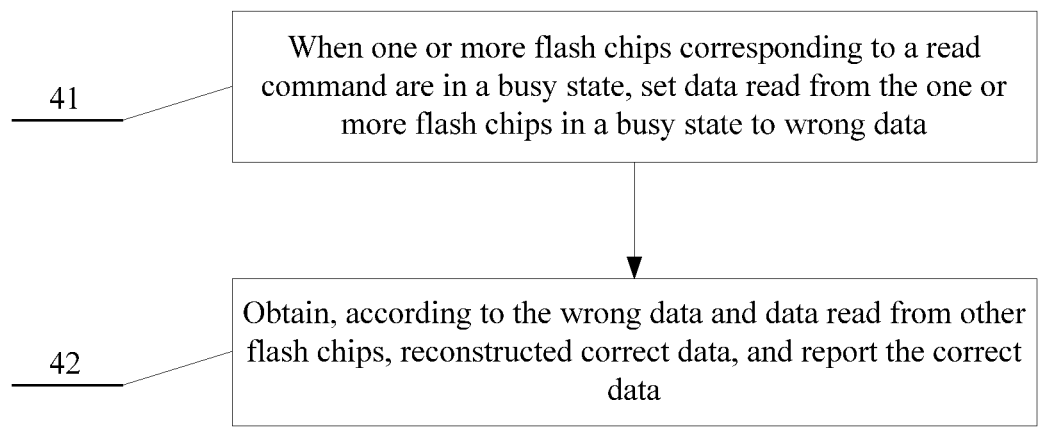
FIG. 4 is a schematic flowchart of a method for reducing a read latency according to an embodiment of the present invention.

FIG. 3 is an overall block flowchart of a method for reducing a read latency according to an embodiment of the present invention. This embodiment is hereinafter described in detail with reference to the accompanying drawings of the specification. As shown in FIG. 4, the method includes:

Step 41. When one or more flash chips corresponding to a read command are in a busy state, set data read from the one or more flash chips in a busy state to wrong data.

When the host delivers a read command for reading data on flash chips, flash chips corresponding to address information are determined according to the address information included in the read command, that is, strips formed by these flash chips are determined. In addition, current states of the flash chips corresponding to the foregoing address information are queried for, that is, whether the flash chips are in a busy state. If a flash chip is in an idle state, data read from the flash chip is directly reported to an error detection/error correction module of an SSD device; if a flash chip is in a busy state, data read from the flash chip is set to wrong data, so that data forwarded to the error detection/error correction module does not comply with an internal check rule of the flash chip. For example, assuming that the check rule is an even parity, the transceiver module constructs a piece of data that does not comply with the even parity requirement, and enables the error detection/error correction module to find this error, so that the error detection/error correction module is triggered to execute the RAID algorithm to correct the wrong data on the flash chip of this channel.

The busy/idle states of flash chips of each channel may be implemented by using a software manner, a hardware manner, or a manner of combining software and hardware. Specific details are as follows:

(1) Software manner: The NAND flash chip provides a state register, and a value of the register may be obtained by using a chip state read command (read status). The busy/idle state of a flash chip can be known according to states 0 and 1 of a specified bit. When the host delivers a command for reading data, states of all flash chips corresponding to this command need to be read.

(2) Hardware manner: The NAND flash chip further provides an R/B# signal, and the R/B# signal may be connected to an SSD controller; the busy/idle state of a flash chip can be known by querying for a level state of a corresponding signal.

(3) Combination of software and hardware: The R/B# signal is an open-drain output, and may support a line AND connection manner. The R/B# signals of all flash chips of a same channel may be connected and then be connected to the controller. In this way, the total quantity of signal cables is greatly reduced. The SSD controller may know, by detecting a level of this line signal, whether there are flash chips in a busy state on a channel, and then differentiates, by using the read status command, which flash chip is in a busy state on this channel. If a flash chip where data that needs to be read is located is in an idle state, the data may be read directly; if the flash chip where data that needs to be read is located is in a busy state, the read data is set to wrong data.

In addition, the state query command (read status) of a flash chip is initiated without being affected by the busy/idle state of the flash chip; if this state query command is delivered by the host, after the transceiver module obtains the state of a flash chip on a corresponding channel, the state of the flash chip is not processed by the error detection/error correction module but is directly reported to the host because the state information is not processed by using the RAID algorithm.

In addition, the internal check rule of the flash chip may further use a Hamming code that has an error detection and correction ability, and the generated wrong data may have many options, which may be determined in advance during the design of the controller. This is because the flash chip in a busy state cannot respond to the command for reading data and the command is neglected. In this way, the data read by the SSD controller is uncertain, which means the data may pass or fail to pass the check of the error detection/error correction module. If the data passes the check, invalid data is reported as correct data. Therefore, to ensure reliability, wrong data must be constructed manually.

Step 42. Obtain, according to the wrong data and data read from other flash chips, reconstructed correct data, and report the correct data.

Specifically, the error detection/error correction module of the SSD device checks data of each channel respectively; if detecting wrong data, the error detection/error correction module corrects the wrong data by using the RAID algorithm; otherwise, the error detection/error correction module directly reports the data to the host. When the error detection/error correction module detects that the data read from a flash chip in a busy state has errors, the error detection/error correction module corrects the data by using the corresponding RAID algorithm, and then reports the data in combination with reconstructed data obtained from other channels to the host to finish a corresponding read operation.

After finding that data of a channel has errors and correcting the data, the error detection/error correction module generally counts the quantity of errors. When the counted quantity of errors exceeds a threshold, the error detection/error correction module reports the counted quantity of errors to the host, requiring to replace the whole SSD (in a scenario where flash chips cannot be replaced individually, for example, when the flash chips are soldered on the motherboard) or replace flash chips of a channel (in a scenario where the flash chips may be replaced individually, for example, the flash chips of each channel form a replaceable module). In this embodiment, channel data on the flash chip in a busy state is processed as wrong data, but the flash chip of this channel is not faulty. Therefore, this case needs to be differentiated to avoid wrong determination. A flag may be defined in the transceiver module, which is 0 by default. Each time when this module intends to construct wrong data and reports the constructed wrong data to the error detection/error correction module, the flag is set to 1; otherwise, the flag is set to 0. Then, the error detection/error correction module may determine, according to this flag, whether to add a value to the error counter.

In a process of reconstructing data, all erase commands and write commands of flash chips of each channel are sent by the transceiver module, but the RAID algorithm has a limited data reconstruction ability, for example, RAID5 can only correct errors on one channel. Therefore, the quantity of flash chips in a busy state in each strip at any time must be limited according to a specific RAID algorithm, which is implemented by the transceiver module. The transceiver module can ensure that the quantity of flash chips in a busy state in each strip does not exceed the data reconstruction ability of the RAID algorithm by controlling the quantity of erase commands and write commands sent to the flash chips of each channel each time and querying for busy/idle states of the flash chips of each channel in real time.

Because manually constructed wrong data is corrected in step 42, and the objective is to reconstruct data, problems of different sources may be processed in a unified manner, where the corresponding problems may be data errors of the flash chips or be that the flash chips are in a busy state, which helps to reuse the module.

This embodiment further provides a method for reducing a read latency by using a RAID controller. To further increase the error tolerance ability and increase performance, the SSD controller generally supports multiple channels, and multiple flash chips are connected to each channel and work in RAID mode. In addition, multiple flash chips store, according to the RAID algorithm, data and check codes in strip manner; when a flash chip is unavailable, data in this flash chip may be restored by using data read from other flash chips in the strip, thereby increasing reliability. There are various types of RAIDs. RAID4 and RAID5 are commonly used in the SSD, where RAID4 stores check codes in all flash chips of a channel, while RAID5 stores check codes in all the flash chips of multiple channels one by one.

Figure 5:
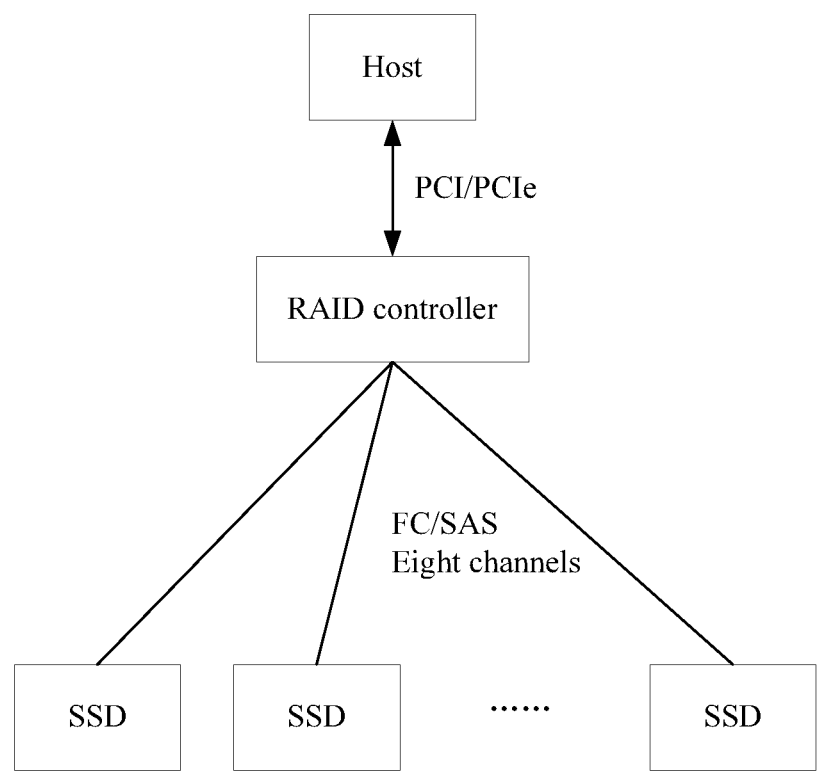
FIG. 5 is a schematic structural diagram of an SSD device in combination with specific hardware and based on a RAID controller according to an embodiment of the present invention.
Figure 6:
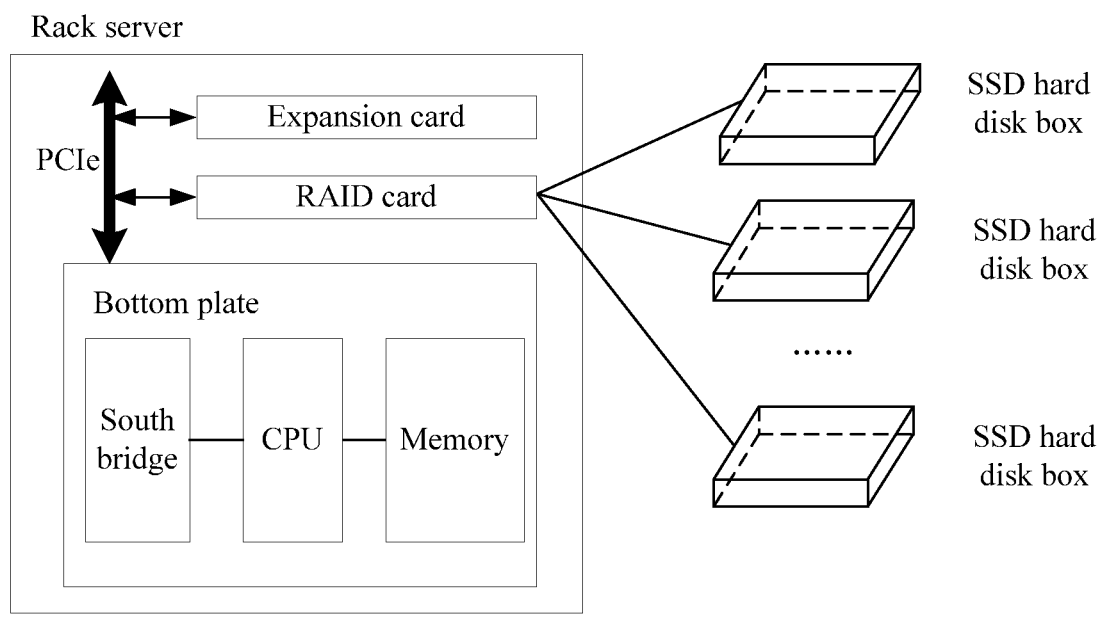
FIG. 6 is a schematic structural diagram of an SSD controller based on a RAID controller according to an embodiment of the present invention.

Similar to the foregoing SSD controller, the RAID controller is also a common device used to increase performance and reliability of the storage system. The RAID controller is generally connected to the host through a Peripheral Component Interconnect (PCI) or a PCIe interface, and is further connected to a hard disk (may be a mechanical hard disk or an SSD) through multiple channels (for example, eight), where each channel uses an SAS or a Fibre Channel (FC) interface and can be connected to only one hard disk, as shown in FIG. 5. FIG. 6 shows an example of a specific scenario, where one expansion card in a rack server is a RAID card, and the RAID card includes a RAID controller connected to SSD controllers in multiple SSD hard disk boxes (including an SSD controller and multiple Flash chips); multiple expansion cards are still connected to a motherboard through a PCIe interface.

The RAID controller stores, according to the RAID algorithm, the data in multiple SSDs in strip manner; when the host delivers a read data request to the RAID controller through the PCI/PCIe interface, if an SSD is executing erase and write operations of the NAND flash chip and does not have a corresponding data reconstruction function, the RAID controller and the SSD must reconstruct data according to the manner used by the SSD controller and the NAND flash chip in the foregoing embodiment, that is, the RAID controller queries, by using a command, for busy/idle states of SSDs of each channel; for SSDs in a busy state, a data transceiver module inside the RAID controller sets data of this channel to wrong data, and reports the wrong data and valid data obtained of other channels to an error detection/ error correction module inside the RAID controller; the error detection/error correction module inside the RAID controller first detects data of each channel, and if finding that data of the foregoing channel in a busy state is wrong, the error detection/error correction module reconstructs, according to the RAID algorithm, the wrong data by using data of other channels, and then reports the data to the host through the PCI/PCIe interface in a unified manner.

By using the technical solution provided by this embodiment, data read from a flash chip is set to wrong data, and reconstructed correct data is obtained according to the wrong data and data read from other flash chips. In this way, when the flash chip is in a busy state, it can be avoided that a read operation is blocked by an erase operation or a write operation, thereby effectively reducing latency and improving a performance of a storage system.

It should be noted that a person of ordinary skill in the art may understand that, all or a part of the steps of the foregoing method embodiments may be implemented by a program instructing relevant hardware. The corresponding program may be stored in a computer readable storage medium, where the storage medium may be a read-only memory (ROM), a magnetic disk, or an optical disc or the like.

Figure 7:
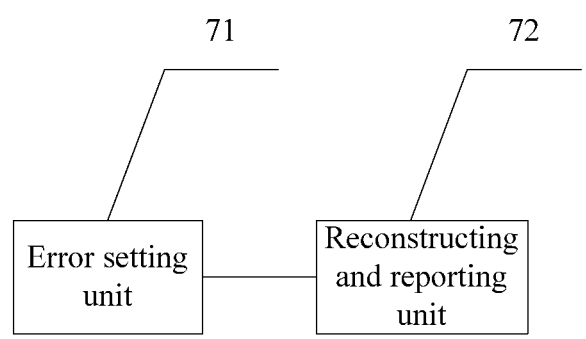
FIG. 7 is a schematic structural diagram of an apparatus for reducing a read latency according to an embodiment of the present invention.

An embodiment of the present invention further provides an apparatus for reducing a read latency, as shown in FIG. 7, including: an error setting unit 71 configured to, when one or more flash chips corresponding to a read command are in a busy state, set data read from the one or more flash chips in a busy state to wrong data; and a reconstructing and reporting unit 72 configured to obtain, according to the wrong data and data read from other flash chips, reconstructed correct data, and report the correct data.

This embodiment can perform corresponding programming on an SSD controller (for example, an FPGA or a similar hardware chip) or a RAID controller to make units and modules that can implement corresponding functions. All units and modules of the apparatus for reducing a read latency may be set in the SSD controller shown in FIG. 2, and may also be set in the RAID controller shown in FIG. 5.

Optionally, the error setting unit 71 may include a determining subunit configured to determine whether the flash chips are in a busy state by detecting busy/idle signal levels of each flash chip, by delivering a read state command, or by detecting busy/idle signal levels of each flash chip and delivering a read state command concurrently.

Optionally, in the error setting unit 71, the read command for reading data on the flash chips is received through an SATA interface, an SAS interface or a PCIe interface.

Optionally, the error setting unit 71 may further include a reading subunit configured to determine, according to a correspondence between an address field carried by a read command packet and addresses of the flash chips in an SSD, a correspondence between the read command and the flash chips.

Optionally, in the error setting unit 71, the setting data to wrong data includes setting the read data to a combination of any data that does not comply with a flash data check rule.

Optionally, the reconstructing and reporting unit 72 may include a reconstructing subunit configured to, after an SSD controller receives sent wrong data and detects data errors, start an error correction function, and obtain the reconstructed correct data by using a data constraint relationship between multiple groups of flash storage units.

Optionally, the apparatus may further include an error counting unit configured to, when it is detected that the read data is wrong and a flag is 0, add 1 to an error counter; and when it is detected that the read data is wrong and the flag is 1, keep the error counter unchanged.

By using the solution provided by this embodiment, data read from a flash chip is set to wrong data, and reconstructed correct data is obtained according to the wrong data and data read from other flash chips. In this way, when the flash chip is in a busy state, it can be avoided that a read operation is blocked by an erase operation or a write operation, thereby effectively reducing latency and improving a performance of a storage system.

Specific implementation manners of the processing functions of each unit included in the foregoing apparatus for reducing a read latency have already been described in the preceding method embodiments, which are not repeatedly described herein.

The solution of the present invention may be described in a general context of a computer executable instruction executed by the computer, for example, a program unit. Generally, the program unit includes a routine, a program, an object, a component, and a data structure that executes a specific task or implements a specific abstract data type. The solution of the present invention may also be implemented in distributed computation environments. In these distributed computation environments, a remote processing device connected by using a communication network executes a task. In the distributed computation environments, the program unit may be located in local and remote computer storage media that include a storage device.

In each embodiment of the specification, description is provided by using a progressive way. Identical and similar parts in each embodiment may refer to each other, and each embodiment focuses on parts different from other embodiments. In particular, since the apparatus embodiments are basically similar to the method embodiments, the descriptions of the apparatus embodiments are relatively simple. For details about related contents, refer to the descriptions of the method embodiments. The described apparatus embodiment is merely exemplary. The units described as separate parts may or may not be physically separate, and parts displayed as units may or may not be physical units, that is, may be located in one position, or may be distributed on a plurality of network units. A part or all of the modules may be selected according to actual needs to achieve the objectives of the solutions of the embodiments. A person of ordinary skill in the art may understand and implement the technical solution without creative works.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be neglected or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes any medium that can store program code, such as a universal serial bus (USB) flash drive, a removable hard disk, a ROM, a random access memory (RAM), a magnetic disk, or an optical disc.

From the foregoing description of the embodiments, it may be clearly understood by a person skilled in the art that the present invention may be implemented by software plus necessary universal hardware, where the universal hardware includes a universal integrated circuit, a universal CPU, a universal memory, a universal device, and the like, and definitely may also be implemented by application-specific hardware, like an application-specific integrated circuit, an application-specific CPU, an application-specific memory, an application-specific device, and the like, but in many cases, the former one is preferred. Based on such an understanding, the technical solutions of the present invention essentially, or the part contributing to the prior art may be implemented in the form of a software product. The computer software product is stored in a readable storage medium, for example, a floppy disk, hard disk, or an optical disc of the computer, and includes several instructions for instructing a computer device (which may be a personal computer, a server, a network device, and the like) to execute the methods described in each embodiment of the present invention.

The above descriptions are merely exemplary implementation manners of the present invention, but the protection scope of the present invention is not limited thereto. Any modification or replacement that can be easily thought of by a person skilled in the art within the technical scope of the present invention shall fall within the protection scope of the present invention. Therefore, the protection scope of the present invention is subject to the protection scope of the claims.

What is claimed is:

1. A method for reducing a read latency, comprising:
   setting data read from one or more flash chips to a combination of any data that does not comply with a flash data check rule when the one or more flash chips corresponding to a read command are in a busy state;
   performing a data check on the read data, wherein the data check results in an error result;
   obtaining data read from other flash chips in response to the error result of the data check in order to reconstruct correct data;
   keeping an error counter unchanged when it is detected that the read data is wrong due to setting the read data when the one or more flash chips corresponding to the read command are in the busy state;
   changing the error counter when it is detected that the read data is wrong not due to setting the read data when the one or more flash chips corresponding to the read command are in the busy state; and
   reporting the correct data.

2. The method according to claim 1, wherein the one or more flash chips are determined to be in the busy state by determining whether the flash chips are in a busy state by detecting busy/idle signal levels of each flash chip, by delivering a read state command, or by detecting busy/idle signal levels of each flash chip and delivering a read state command concurrently.

3. The method according to claim 2, wherein the read command for reading data on the flash chip is received through a Serial AT Attachment (SATA), a Serial Attached Small Computer System Interface (SAS) or a Peripheral Component Interconnect Express (PCIe) interface.

4. The method according to claim 2, further comprising determining, according to a correspondence between an address field carried by a read command packet and addresses of flash chips in an solid-state drive (SSD), a correspondence between the read command and the flash chips.

5. The method according to claim 1, wherein obtaining the reconstructed correct data comprises, after a solid-state drive (SSD) controller receives sent wrong data and detects data errors, starting an error correction function, and obtaining the reconstructed correct data by using a data constraint relationship between multiple groups of flash storage units.

6. An apparatus for reducing a read latency, comprising:
   an error setting unit configured to:
      set data read from one or more flash chips to a combination of any data that does not comply with a flash data check rule when the one or more flash chips corresponding to a read command are in a busy state;
      performing a data check on the read data, wherein the data check results in an error result;
      keeping an error counter unchanged when detected that the read data is wrong due to setting the read data when the one or more flash chips corresponding to the read command are in the busy state; and
      changing the error counter when it is detected that the read data is wrong not due to setting the read data when the one or more flash chips corresponding to the read command are in the busy state; and
   a reconstructing and reporting unit configured to:
      obtain data read from other flash chips in response to the error result of the data check in order to reconstruct correct data; and
      report the correct data.

7. The apparatus according to claim 6, wherein the error setting unit comprises a determining subunit configured to determine whether the flash chips are in a busy state by detecting busy/idle signal levels of each flash chip, by delivering a read state command, or by detecting busy/idle signal levels of each flash chip and delivering a read state command concurrently.

8. The apparatus according to claim 7, wherein in the error setting unit, the read command for reading data on the flash chip is received through a Serial AT Attachment (SATA), a Serial Attached Small Computer System Interface (SAS) or a Peripheral Component Interconnect Express (PCIe) interface.

9. The apparatus according to claim 7, wherein the error setting unit further comprises a reading subunit configured to determine, according to a correspondence between an address field carried by a read command packet and addresses of flash chips in a solid-state drive (SSD), a correspondence between the read command and the flash chips.

10. The apparatus according to claim 6, wherein the reconstructing and reporting unit comprises a reconstructing subunit configured to, after a solid-state drive (SSD) controller receives sent wrong data and detects data errors, start an error correction function, and obtain the reconstructed correct data by using a data constraint relationship between multiple groups of flash storage units.

* * * * *